United States Patent
Afshar et al.

(10) Patent No.: US 7,830,861 B2
(45) Date of Patent: Nov. 9, 2010

(54) METHOD AND APPARATUS FOR FUNCTIONAL ARCHITECTURE OF VOICE-OVER-IP SIP NETWORK BORDER ELEMENT

(75) Inventors: Siroos K. Afshar, Englishtown, NJ (US); Cameron Scott Blandford, Newport News, VA (US); Alireza Faryar, Fair Haven, NJ (US); Burwell Goode, Weston, CT (US); Behzad Nadji, Los Gatos, CA (US); Radhika R. Roy, Howell, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1580 days.

(21) Appl. No.: 10/790,264

(22) Filed: Mar. 1, 2004

(65) Prior Publication Data
US 2005/0083912 A1    Apr. 21, 2005

Related U.S. Application Data

(60) Provisional application No. 60/511,716, filed on Oct. 16, 2003.

(51) Int. Cl.
  *H04L 12/66* (2006.01)
  *H04L 12/50* (2006.01)
  *H04Q 11/00* (2006.01)
(52) U.S. Cl. .................. 370/352; 370/356; 370/360
(58) Field of Classification Search .................. 370/352, 370/466, 356, 486; 709/230; 379/229
See application file for complete search history.

(56) References Cited

U.S. PATENT DOCUMENTS

| | | | |
|---|---|---|---|
| 6,625,274 B1 * | 9/2003 | Hoffpauir et al. ........... | 379/229 |
| 7,330,483 B1 * | 2/2008 | Peters et al. ................ | 370/466 |
| 2004/0028080 A1 * | 2/2004 | Samarasinghe et al. ..... | 370/486 |
| 2004/0249963 A1 * | 12/2004 | Klaghofer et al. ........... | 709/230 |
| 2008/0084874 A1 * | 4/2008 | Ganesan et al. ............. | 370/356 |
| 2008/0107130 A1 * | 5/2008 | Peters et al. ................ | 370/466 |

FOREIGN PATENT DOCUMENTS

| EP | A1351478 | 10/2003 |
|---|---|---|
| WO | WO-03/039096 | 5/2003 |

OTHER PUBLICATIONS

"VoIP", AT&T Point of View, Dec. 22, 2003.

(Continued)

*Primary Examiner*—Thjuan K Addy (57) ABSTRACT

In order to provide a single common cost-efficient architecture for real time communication services for audio, video, and data over internet protocol, a voice over internet protocol (VoIP) system and architecture is provided by placing border elements (BEs) at the interface boundaries between the access network the user devices use and the VoIP infrastructure. The BEs use SIP protocol as the access call control protocol over any access networking technologies, for example, IP, Ethernet, ATM, and FR, and provides all services transparently to the end users that use SIP-enabled devices.

To enable a scalable system, the SIP BEs are decomposed into separate communicating entities that make the SIP BE scalable and provide new capabilities not previously available by a self-contained SIP BE. Further, multiple levels of decomposition of a SIP BE can be provided by the present invention supporting a flexible and scalable SIP BE design that further improves system efficiencies and cost advantages as compared to use of single integrated border or edge elements. Further, a scalable SIP BE, made up of a plurality of physical entities for optimization of a large scale design, acts as a single integrated functional entity to logically execute a set of functions at the border of a VoIP infrastructure.

20 Claims, 8 Drawing Sheets

OTHER PUBLICATIONS

Anquetil et al., "Media Gateway Control Protocol and Voice Over IP Gateways", Electrical Communication, Alcatel. Brussels, Apr. 1, 1999, pp. 151-157.
Rosenberg, et al., *Standrads Track*, "SIP: Initiation Protocol", RFC 3261, Jun. 2002, pp. 1-252.
Examiner's Report for CA 2,481,138, Nov. 6, 2007, pp. 1-2.
EP Search Report for EP-04270007, copy consists of 4 unnumbered pages, Submitted on Jun. 28, 2007.

"VoIP" AT&T Point of View; "Common VoIP Archictecture", Dec. 22, 2003 XP002407957.
Anquetil L-P., et al., "Media Gateway Control Protocol and Voice Over IP Gateways—MGCP and VoIP gateways will offer seamless interworking of new VoIP networks with today's telephone networks" Electrical Communication, Alcatel, Brussels, BE, Apr. 1, 1999, pp. 151-157.

* cited by examiner

METHOD AND APPARATUS FOR FUNCTIONAL ARCHITECTURE OF VOICE-OVER-IP SIP NETWORK BORDER ELEMENT

CROSS-REFERENCE TO RELATED APPLICATIONS

The present invention claims the benefit of U.S. Provisional Application Ser. No. 60/511,716 filed Oct. 16, 2003 and entitled "Methods and Apparatus for Functional Architecture of Voice-over-IP SIP Network Border Element" which is incorporated by reference herein in its entirety.

FIELD OF THE INVENTION

The present invention relates generally to improved methods and apparatus for providing services using Voice-over-Internet-Protocol networks, and more particularly to advantageous aspects of scalable border elements (BEs) that support and operate with a session initiation protocol (SIP) to improve the connectivity layer.

BACKGROUND OF THE INVENTION

At present, real-time communication services, for example, voice and multimedia (audio, video, and data), are being provided using specific networking technologies such as public switched telephone networks (PSTN). Typically, voice signals are converted to digital form and then time division multiplexing (TDM) is used to allocate different conversations to periodic time slots. Other popular networking technologies include internet protocol (IP), a formal set of rules for sending data across the internet, frame relay (FR), a telecommunication service providing variable-sized data packets for cost-efficient data transfer, and asynchronous transfer mode (ATM), a high speed networking standard. All networking technologies have their own call control services, for example, integrated services digital network user part (ISUP)-over-TDM and H.323-over-IP/ATM where H.323 is a protocol standard for the real-time transmission of audio, video and data communications. However, providing a single common cost-efficient architecture for real-time communication services for audio, video, and data, that can be offered for any call control protocols, for example, session initiation protocol (SIP), H.323, ISUP, or the like, using any access networking technologies, for example, IP, FR, ATM, TDM, or the like, is a difficult problem.

In addition, a wide variety of networking conditions must be supported. Such networking conditions may include the number of user devices to be connected, the kind of services each user device wants, the types of media each user device likes to use for each call, the frequency of each type of call of each user device, the time of each type of call of each user device, and the peak/average bandwidth required by all media of all calls of all user devices at a given time. In addition, the performance and quality-of-service (QoS) required for each media by each call, whether or not each type of call is made by a fixed or mobile user device, whether or not transcoding needs to be done for audio or video of each call of each user device, and the geographical coverage of all user devices that are connected must also be considered. Other criteria, for example, whether a call is a point-to-point call, a multipoint call, a local call, a long distance call, a national call, an international call, an E-911 emergency call, or the like, are important to be supported. Consequently, a further problem concerns the design of an architecture that is scalable for alternative sets of networking conditions and provides real-time communication services transparently to the end user devices.

SUMMARY OF THE INVENTION

In order to provide a single common cost-efficient architecture for real time communication services between user devices for audio, video, and data over internet protocol, a scalable voice over internet protocol (VoIP) system and scalable architecture is provided by the present invention. In this scalable system, border elements (BEs) are placed at the interface boundaries between the access network which the user devices use and the VoIP infrastructure. While there are different types of BEs that can be used depending upon the interface to the access layer, exemplary aspects of a SIP BE are presented in detail. A SIP BE in accordance with the present invention uses SIP protocol as the access call control protocol over varied access networking technologies, for example, IP, Ethernet, ATM, and FR, and provides all services transparently to the end users that use SIP-enabled devices. Such a SIP BE communicates with all SIP-enabled entities of the VoIP Infrastructures using SIP protocol for invoking services for the end user devices. In addition, the SIP BE also uses other protocols as necessary for communication with non-SIP entities of the VoIP Infrastructure as needed, because SIP may not have the necessary capabilities for invoking all services.

Note that if a service provider is to offer services by building an intelligent services infrastructure efficiently with economies of scale over a large network that may, for example, span six continents serving billions of customers, using a protocol such as the peer-to-peer SIP protocol, the architecture design of the SIP border element is a critical piece of the overall VoIP infrastructure. Further, even though it is possible to design a SIP BE in an integrated fashion realizing all the BE functions in a single physical box, without exposing its inner functional entities, this type of design is not scalable in a cost-effective manner for many situations that are required by a large-scale real-time communication architecture. Specifically, if a SIP BE is realized in a single physical box, the processes that are developed within the physical entity are not exposed to the outside world. As a result, the inter-communications among those internal processes cannot be known, and the SIP BE processes cannot be separated out should scalability dictate that there is a need for a separation between the signaling and media processes.

Consequently, the present invention takes the approach of decomposing the SIP BE into separate communicating entities that make the SIP BE scalable and provide new capabilities including optimization of functions and economies of scale not available by a self-contained SIP BE. Further, multiple levels of decomposition of a SIP BE can be provided by the present invention supporting a flexible and scalable SIP BE design that further improves system efficiencies and cost advantages as compared to use of single integrated border or edge elements.

Architecture-defined functions are also addressed herein. These functions advantageously facilitate the offering of intelligent services by the SIP-based entities of the service complex transparently to the user devices. Further, a scalable SIP BE, made up of a plurality of physical entities for optimization of a large scale design, acts as a single integrated functional entity to logically execute a set of functions at the border of a VoIP infrastructure.

A more complete understanding of the present invention, as well as other features and advantages of the invention, will

DETAILED DESCRIPTION

While the present invention is described herein in the context of various SIP BE architecture alternatives, where each architecture acts as a single logical SIP BE and uses the session initiation protocol (SIP) between the user device and the SIP BE, it may be adapted as appropriate as communication protocols evolve. For details on SIP, see J. Rosenberg, H. Schulzrinne et al., "SIP: Session Initiation Protocol," Internet Engineering Task Force (IETF) Network Working Group, Request for Comments 3261 (June 2002), which is incorporated by reference herein and referenced as rfc3261. As mentioned earlier, the SIP BE may also use other protocols as appropriate for invoking of services that may not be possible in using SIP and these are addressed further below.

Figure 1:
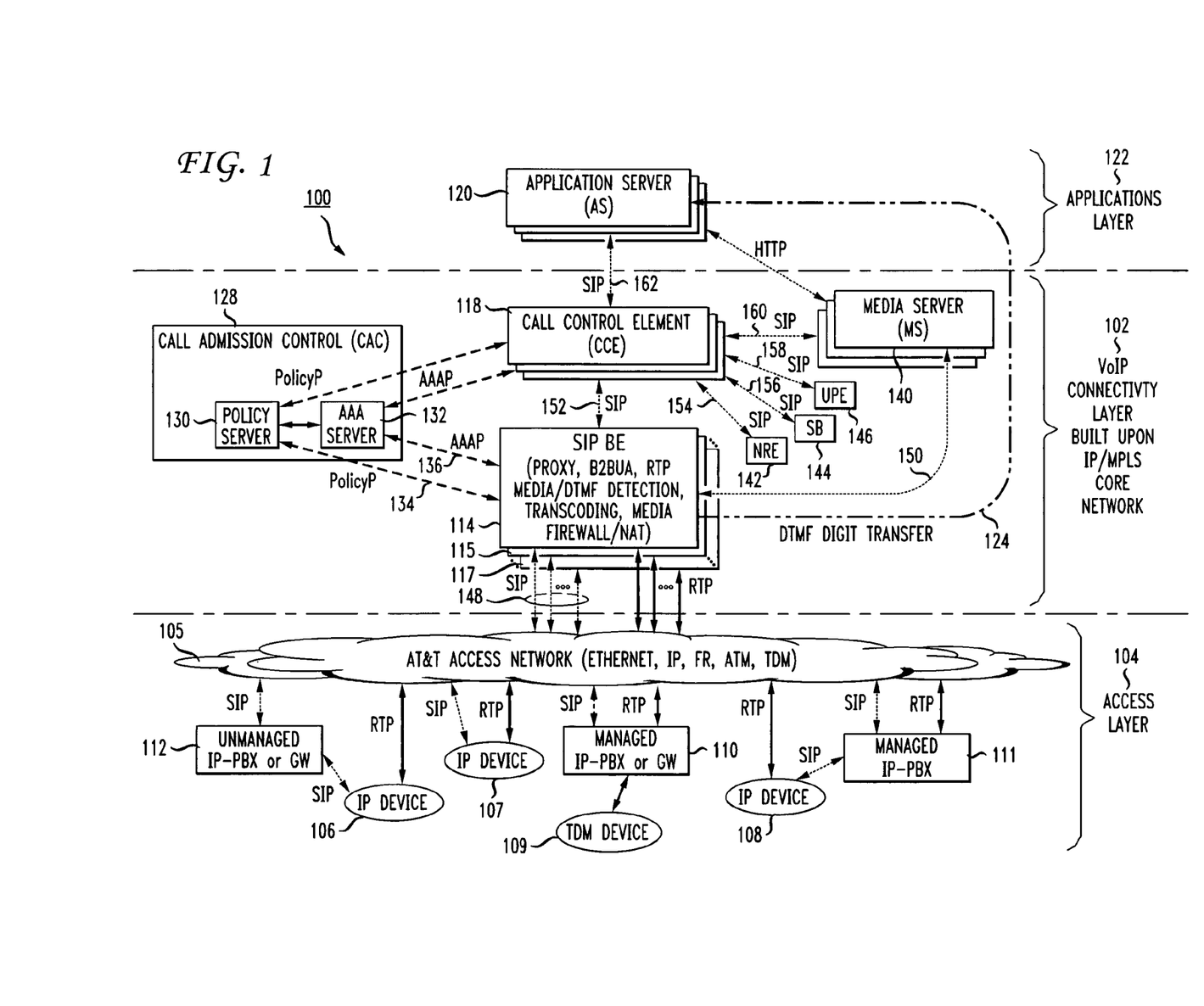
FIG. 1 illustrates a system view of an applications layer, a VoIP connectivity layer, and an access layer of AT&T's common VoIP architecture.

Providing real time communication services over internet protocol is commonly referred to as voice over internet protocol (VoIP) and the term VoIP architecture, as used herein, specifies a single, common, and shared infrastructure for audio, interactive text and video, and various multi-media collaboration services. To accomplish such ends, a VoIP architecture 100 as illustrated in FIG. 1 is divided into separate independent layers. One of these layers, the VoIP connectivity layer 102, is built as a virtual network on top of AT&T's converged internet protocol/multi-protocol label switching (IP/MPLS) core network. The IP/MPLS core network connects with an access layer 104 containing a multi-service access/multi-service edge network, referred to as the AT&T access network 105 that supports popular access technologies including TDM, ATM, frame relay and ethernet. Various user internet protocol (IP) devices 106-108, TDM devices 109, managed and unmanaged IP-private branch exchange (PBX) or gateway (GW) devices 110-112 can be and typically will be attached to the AT&T access network 105. The VoIP architecture further specifies capabilities to support various access protocols such as H.323, media gateway control protocol (MGCP), media gateway control (MEGACO), SIP, TDM/SS7, as well as any VoIP protocol that may emerge in the future. Such support is achieved by placing border elements (BEs) 114, 115, . . . , 117 at the interface of the VoIP connectivity layer 102 with the access layer 104. Further details of operation of the VoIP architecture 100 may be found in U.S. application Ser. No. 10/748,707 filed Dec. 30, 2003 and entitled "An Access Independent Common Architecture For Real-Time Communications Services For Networking Environments" claiming priority under 35 U.S.C. §119(e) to Provisional Application Ser. No. 60/446,448 filed Feb. 11, 2003 both of which are incorporated by reference in their entirety herein.

The BEs mark the trust boundary for the VoIP core network and an entry point into the VoIP infrastructure by translating the various VoIP access protocols into SIP, the single common internal protocol used by all VoIP infrastructure components. The BEs thereby make the VoIP infrastructure independent of any access call control protocols, such as an external SIP interface, H.323, or ISUP/SS7, and networking technologies, such as IP, ethernet, TDM, FR, and ATM. BEs not only provide protocol conversion, but also provide other functions, such as functions to enforce various policies including those needed for call admission control (CAC) 128 and VoIP-level security ensuring reliability and availability.

To accomplish this important role in the VoIP infrastructure, each SIP BE 114-117 operates to perform a number of functions including signaling, media control, security and call admission control. For the signaling function, the SIP BE proxies both a caller and the called end-points, thereby providing a point of signaling control at the boundary to the access layer. Note that a proxy or a proxy server, as described by rfc3261, is an intermediary entity that acts as both a server and a client for the purpose of making requests on behalf of other clients. A proxy server primarily plays the role of routing, which means its job is to ensure that a request is sent to another entity "closer" to the targeted user device.

Proxies are also useful for enforcing policy, for example, making sure a user device is allowed to make a call. A proxy interprets, and, if necessary, rewrites specific parts of a request message before forwarding it.

The SIP BE also provides intelligent protocol handling with the end system, devices, and user devices and also provides communication with the service entities within the VoIP Infrastructure using, for example, SIP, remote access dial up user (RADIUS) and its enhanced version (DIAMETER), hyper-text transfer prototcol (HTTP)/key-pad markup language (KPML), or the like. In addition, a SIP BE can act as a back to back user agent (B2BUA) to a call control element (CCE), such as CCE 118, to manage and track calls and control call creation and disconnection, thereby providing centralized call management of SIP signaling and real time protocol (RTP) media. A SIP BE may also act as the SIP B2BUA to other SIP-based entities, such as a media server (MS) 140 and other BEs. A B2BUA, as described in rfc3261, is a logical entity that receives a request and processes it as a user agent server (UAS). In order to determine how the request should be answered, it acts as a user agent client (UAC) and generates requests. Unlike a proxy server, it maintains dialog state and must participate in all requests sent on the dialogs it has established. Since it is a concatenation of a UAC and UAS, no explicit definitions are needed for its behavior. A UAC is a logical entity that creates a new request, and then uses the client transaction state machinery to send it.

The role of UAC lasts only for the duration of that transaction. In other words, if a piece of software initiates a request, it acts as a UAC for the duration of that transaction. If it receives a request later, it assumes the role of a user agent server for the processing of that transaction. A UAS is a logical entity that generates a response to a SIP request. The response accepts, rejects, or redirects the request. This role lasts only for the duration of that transaction. In other words, if a piece of software responds to a request, it acts as a UAS for the duration of that transaction. If it generates a request later, it assumes the role of a user agent client for the processing of that transaction.

Each SIP BE provides media control by examining all media streams going in and out of the connectivity layer for security, media format conversions or media transcoding, for example, between G-series audio codecs and between H-series video codecs, detection of services intelligence that may reside in a media stream, notification of detected service intelligence to the appropriate service entity offering services to the user device, and media transfer. Some services require the ability for an application server (AS), such as AS 120, located in application layer 122, to detect a signal that does not need to be on the media path, for example, dual tone multi-frequency (DTMF) and a notification to the AS of such detection is provided over path 124. For example, a prepaid card application may permit the caller to enter a sequence of digits such as "**9" which forces a hang-up of the destination and provides the opportunity for another call to be placed. To enable efficient utilization of network resources, the SIP BE will signal the AS when such an event is detected.

Each SIP BE provides security control for the customer sites it interacts with so that no security attack can happen to any entities residing within the VoIP Infrastructure. It authenticates subscribers, customers, and partners, and provides network address translation (NAT) and firewall functions as appropriate.

Each SIP BE also provides call admission control which enforces admission policies over the access pipe. Such policies can include call gapping which limits the call set up rate, call limiting, which limits the number and type of calls, and bandwidth management that ensures the media bandwidth being sent matches the profile negotiated through signaling.

Returning to FIG. 1, an exemplary SIP BE 114 is shown that is communicating with various entities outside and inside of the VoIP Infrastructure. There can be many BEs that form the boundary of the VoIP Infrastructure for connecting all the end-user systems and for providing services transparently by the service functional entities residing in the VoIP architecture. In this context, as shown in FIG. 1, the functions of the SIP BE are realized in a single physical entity. To accomplish these functions, the SIP BE communicates with the end-user system through the access layer to, for example, IP private branch exchanges (PBXs), IP gateways (GWs), IP devices, SIP phones, and within the VoIP infrastructure to a call control element (CCE) 118 using SIP protocol. The SIP BE may also communicate with the CAC 128 functional entities including a policy server 130 and the authentication, authorization, and accounting (AAA) server 132 using a policy protocol 134, such as the common open policy service (COPS), and a AAA protocol 136, such as RADIUS/DIAMETER. It may be noted that a SIP BE may transfer services intelligence detected in media streams, such as DTMF, to the application server (AS) using SIP, HTTP/KPML, or other protocols 124 per the direction of the CCE 118.

The VoIP connectivity layer 102 also contains other network functions needed for applications to provide services with SIP interfaces, 148, 150, 152, 154, 156, 158, 160, and 162, provided between numerous entities of the VoIP connectivity layer 102 as the primary interfacing protocol. Media server 140 handles and terminates media streams, providing functions such as announcements, text to speech (TTS), and automatic speech recognition (ASR). The MS 140 also acts as the SIP end point for media bridging, for example, for audio, video, and data, announcements, and provides other media stream functions. The network routing engine (NRE) 142 provides route information, required to set up the call leg between the source and destination BE, translates a network address or logical address to an IP address and performs other routing services. The service broker (SB) 144 maintains subscriber service information in a database of installed and activated services, provides the CCE 118, upon request, with the address of the appropriate AS, such as AS 120, to treat the call and provides other service broker functions. The user profile engine (UPE) 146 contains user device data, including registered devices, presence information, such as offline, busy, or the like, and geographical location.

However, the realization of all functions in single physical SIP BEs may not always be scalable. For example, a SIP BE must support RTP media streams that may require 100 gigabits per second throughput bandwidth pipes while the signaling function itself requires considerably lower and different CPU processing capacity. Further, supporting interfaces that are not in the same floor or even the same building or possibly not even in the same continent would require the use of multiple integrated physical SIP BEs. Such an approach is not a cost effective solution for large networks, and especially not for those that span continents.

Figure 2:
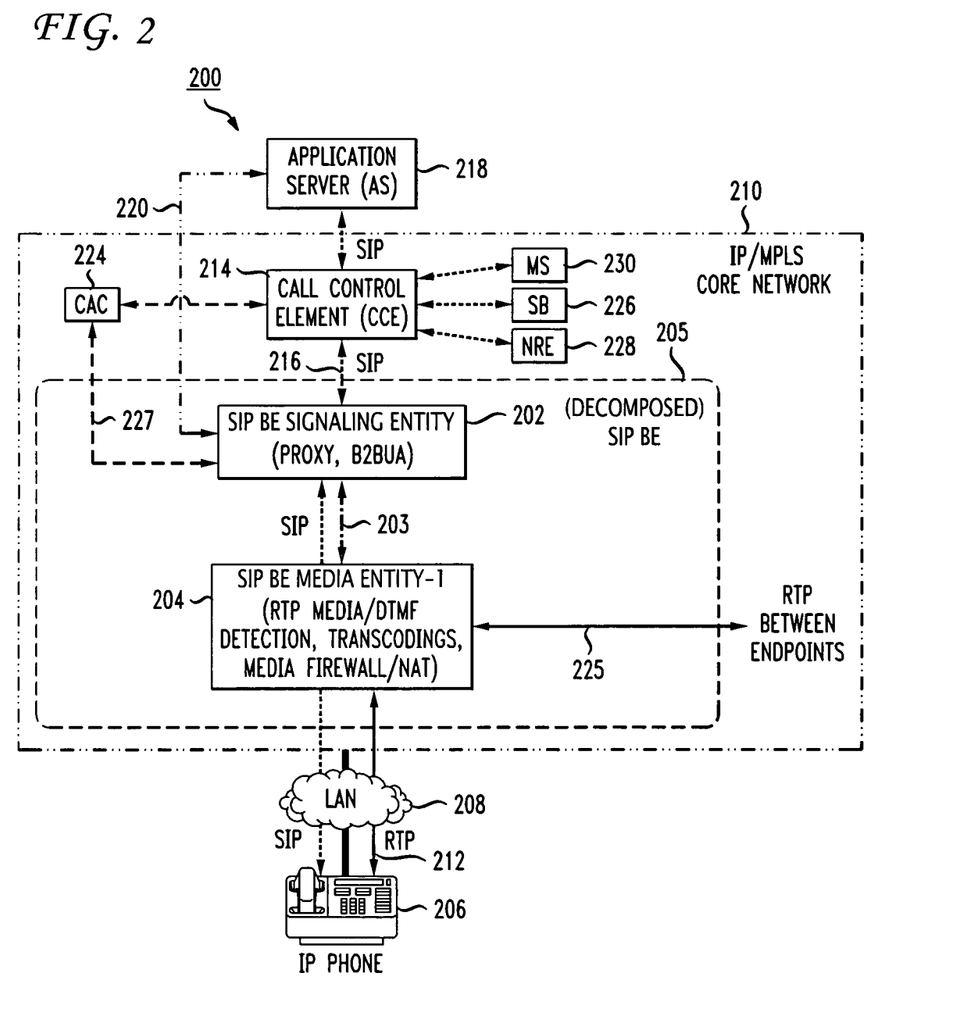
FIG. 2 illustrates a decomposed SIP BE in a simplified VoIP environment where a SIP BE is separated into two physical entities for signaling and media related processing in accordance with the present invention.

What is required is a way of splitting the functions of a SIP BE into at least two different physical entities such that the processing capabilities of each BE function can be optimized and shared while still maintaining a logical view as a single SIP BE. The present invention addresses such splitting of functions by decomposing a SIP BE as described further below. FIG. 2 shows a simplified VoIP system 200 consisting of an application server (AS) 218, a user device 206, and an access network LAN 208 connected to a VoIP connectivity layer 210 built upon an IP/MPLS network. The VoIP layer 210 further containing a CCE 214, a CAC 224, an MS 230, an SB 226, an NRE 228 and the decomposed SIP BE 205. The decomposed SIP BE 205 is realized by two separate physical entities, a SIP BE signaling entity 202 and a SIP BE media entity-1 204 which together act as a single logical SIP BE. For simplicity, FIG. 2 shows only a single user device 206 attached to a SIP BE media entity-1 204, however, the present invention may simultaneously accommodate a plurality of user devices attached to a media entity.

All functional features of the SIP BE can have many processes for actual physical realization. For example, SIP signaling features, that are one of the main concerns of the SIP signaling entity 202, primarily include the processes for SIP protocol handling including SIP user agent (UA), SIP proxy, and SIP B2BUA function as described by RFC 3261. Similarly, media functions like DTMF digit detection, RTP re-origination, firewall/NAT function (e.g., opening/closing pinholes, packet filtering), media (e.g., audio, video, real-time text) transcoding, ring tone generation and related functions are the primary concern of the media entity-1 204. However, each function of the media entity-1 can be realized in an individual process. For example, one of the important functions of the SIP BE is in providing security control and this must be maintained in the decomposed SIP BE. Specifically, the SIP BE acts as the SIP protocol-aware firewall (FW)/network address translator (NAT) control proxy for opening and closing pinholes (IP addresses, ports) for SIP signaling and RTP media traffic as well as packet filtering based on security policy. However, various security functions may reside inside the media entity-1 204, and, consequently, the SIP BE signaling entity 202 provides security policy control through a FW/NAT control protocol, such as the protocol developed by internet engineering task force's (IETF's) MIDCOM WG, or others, between the signaling entity 202 and the media entity-1 204.

The inter-communications between different processes can be divided in several ways. At a higher level, the communication is done between the signaling entity and the media entity-1. For example, the signaling entity indicates to the media entity the IP address and the port number of each media that needs to be monitored for media re-origination, the DTMF digits/strings that need to be detected for notification and terminating those digits/strings from the RTP streams, the transcoding scheme of each media (if any), and the quality-of-service (QoS) for each media that needs to be maintained. Also, information for opening and closing of pinholes as well as packet filtering rules for each media traffic for the call, and related information are provided between the signaling and media entities. This level of communication requires a standard protocol for communications between the two entities, 202 and 204, to support a scalable design.

When the SIP BE signaling entity 202 and the SIP BE media entity-1 204 are located in two different physical locations, as shown in FIG. 2 and in accordance with the present invention, a secure communications protocol is used that can recover from transmission errors. Another important aspect of this embodiment of the invention is that the SIP BE signaling entity 202 controls the SIP media entity-1 204 so, a master-slave like protocol 203 is used between the SIP signaling 202 and the media entity-1 204. This controlling protocol used between these two entities, 202 and 204, can be media gateway control protocol (MGCP), media gate control protocol (MEGACO), internet protocol device control (IPDC), or another similar protocol. For example, MGCProtocol or MEGACO protocol has the properties of master-slave operation where the SIP signaling entity can act as the master and the media entity (or subsets of the media entity) can act as the slave in communicating the information for executing the desired functions as explained earlier. Similarly, any other protocols that have similar properties can be used between the signaling and media entity, or subsets of the media entity. In order to have global control over the media entity, or subsets of the media entity, all signaling communications to the CCE 214 or to the AS 218 must be done by the SIP BE signaling entity 202.

The SIP BE signaling entity 202 is also be able to communicate with the CAC 224 policy (security, accounting, QoS), security, and accounting server using the appropriate protocols, for example, COPS and LDAP and RADIUS/DIAMETER. It may be noted that both local and global policies, such as for security, accounting, and QoS, are determined by the CCE 214 and stored in the CAC 224 server under the control of the CCE. However, the local policies are implemented by the SIP BE as delegated by the CCE 214. The SIP BE loads the policies from the CAC 224 policy server using different protocols such as LADP for security policies and COPS for QoS policies using the interface 227 to the CAC 224. If a caller makes a call using SIP protocol, the SIP BE needs to authenticate the caller. In order to authenticate the caller, the SIP BE communicates with the CAC 224 server using the RADIUS/DIAMTER protocol after translation of the necessary parameters into RADIUS/DIAMTER from the SIP signaling messages. The CAC 224 server then responds back to the SIP BE signaling entity 202 after checking its security database for authentication of the user device. If the authentication of the caller is successful, the SIP BE signaling entity 202 then forwards the call to the CCE 214, otherwise it rejects the call and informs the CCE 214 accordingly.

The SIP BE signaling entity 202 is also able to transfer DTMF digits to the AS using a separate protocol path 220 for SIP, HTTP/KPML, or other protocols as appropriate when these digits are sent by the SIP BE media entity-1 204 to it. As noted earlier, the SIP BE signaling entity 202 communicates with the SIP BE media entity-1 204 for purposes of controlling the media entity-1 for such functions as when to detect DTMF digits and sending those digits, addresses and ports from which media are to be received and to which media are to be routed. The SIP BE media entity-1 204 examines the RTP media streams to detect whether any service intelligence like DTMF is there. If it detects service intelligence, for example DTMF, in the media streams, it notifies the SIP BE signaling entity using the communication protocol as dictated by the signaling entity 202. Also, the SIP BE signaling entity 202 provides control information to the media entity-1 204 on how to overcome a startup or a failure condition of media and signaling transfers, QoS and performance parameters that need to be maintained in the RTP media streams, or the like.

The SIP BE signaling entity 202 also instructs the SIP BE media entity-1 204 for media transcoding based on the VoIP QoS policy as dictated by the CCE 214 and/or loaded from the QoS policy server located in the CAC 224. For example, the CCE 214 may decide the QoS policy is such that, if the two audio codecs of the caller and the called party are not the same, all audio transcodings need to be done using G.711 audio, and this QoS policy is stored in the CAC 224 internal policy server. The CAC 224 policy server then distributes the QoS policy to the SIP BE signaling entity 202 using COPS protocol, for example. Alternatively, the SIP BE signaling entity 202 can load the QoS policy from the CAC policy server. The security and the accounting policies are handled in a similar manner.

One of the functions of the SIP BE media entity-1 204 is to handle RTP media streams as directed by the SIP BE signaling entity 202. The signaling and media streams go via two different paths. A signaling stream always flows between the VoIP infrastructure and a user device using the SIP BE signaling entity 202. A media stream flows between user devices and their connected SIP BE media entities, such as entity 204 for example, following path 225, and cost-security-performance tradeoffs are made in finding the best path for the media to follow. For example, when a call comes, the signaling entity decides which media-type is to be handled, which IP address and port number each media stream is to be received from and which IP address and port number each media stream is to be routed to. For this routing control, a communications protocol such as MGCP, MEGACO, IPDC, or other similar protocol, as stated previously is used between the media and the signaling entity.

A signaling entity can control one or more media entities as the signaling entity does not need extensive media handling throughput capacity. The throughput capacity of the signaling entity depends on the total number of calls that need to be processed simultaneously at a given period of time. In addition, the IP addresses and the port numbers that need to be allocated for handling different media entities need to be considered. The throughput capacity of the media entity depends on the actual media, for example, audio, video, data, and instant messaging (IM) traffic that needs to be supported and required by all calls at a given period of time. For example, a given multimedia call may require multi-megabits of media traffic, but it is only one call. However, the processing capacity for handling of the call by the signaling entity remains the same because it is processing only one call. So, the resource requirements for the signaling and media entity depend on different criteria. As a result, depending on certain networking capabilities, a single SIP BE signaling entity can control multiple media entities in order to provide the scalability and cost efficiencies required.

Figure 3:
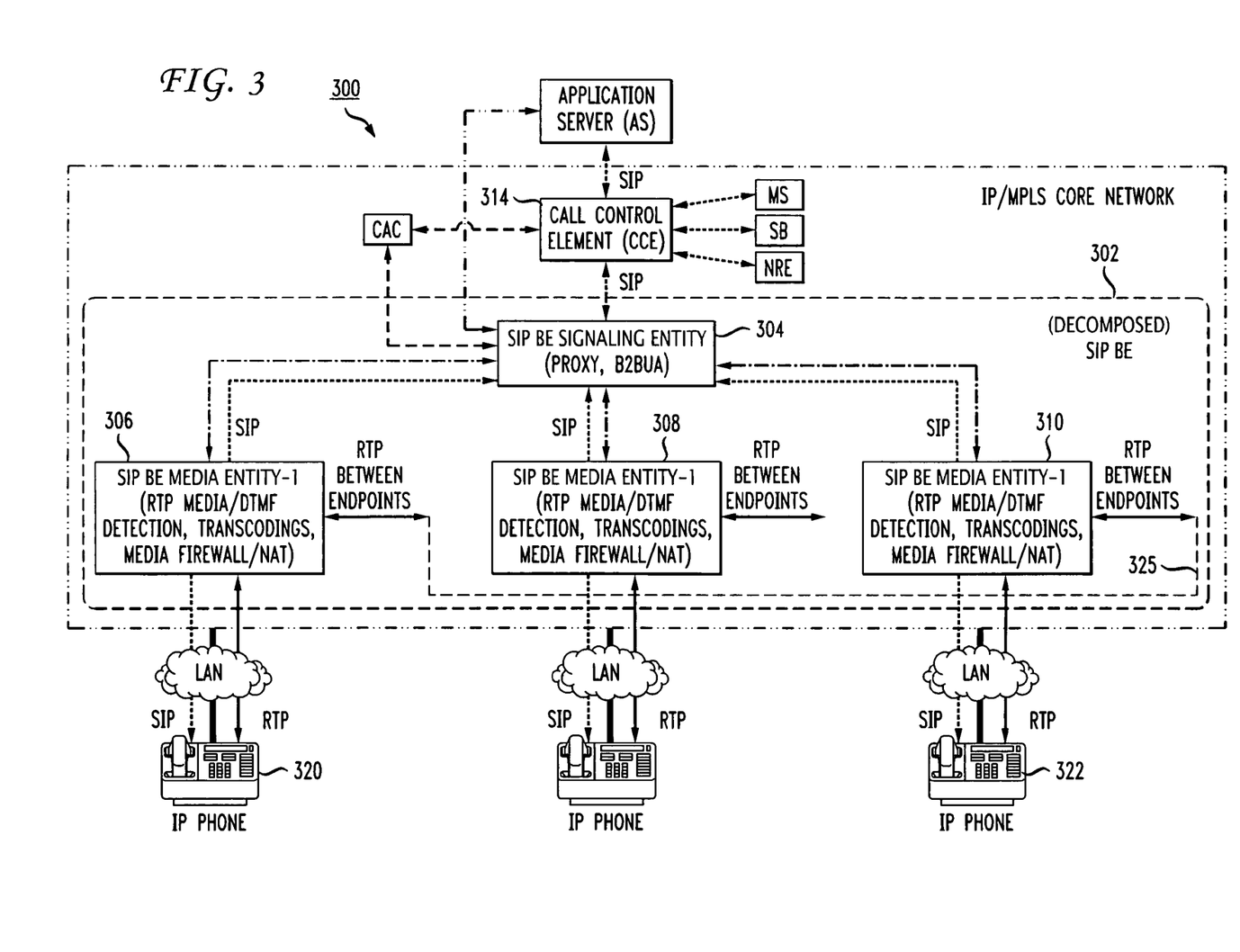
FIG. 3 illustrates various scalable aspects of the decomposed SIP BE of FIG. 2 where a single decomposed SIP BE signaling entity controls multiple type-1 SIP BE media entities.

A scalable decomposed SIP BE system 300 FIG. 3 illustrates how a decomposed SIP BE 302 with a single SIP BE media entity 304 can control many SIP BE media entities 306, 308 and 310. In an exemplary case with a single decomposed SIP BE 302, the logical path for signaling messages between two user devices is as follows: user device 320 initiates a call, connects to SIP BE signaling entity 304, connects to CCE 314, connects to SIP BE signaling entity 304, and connects to user device 322 as the call destination. The CCE 314 may connect to other functional entities of the VoIP infrastructure as necessary to manage and service the call. The logical path for media between two user devices is as follows: user device 320 initiates a call, connects to SIP BE media entity 306, connects, over a network path, such as the logical RTP between endpoints path 325, using RTP, to SIP BE media entity 310, and connects to user device 322 as the call destination. The SIP BE media entities are typically placed in relatively close proximity to user devices to minimize media delay latencies. The SIP BE signaling entity may be more centrally located to service multiple SIP BE media entities. For simplicity, FIG. 3 shows only a single user device, such as user device 320 and 322, attached to each SIP BE media entity-1, such as SIP BE media entities-1 306 and 310, respectively, however, the present invention may simultaneously accommodate a plurality of user devices attached to each SIP BE media entity-1.

A SIP BE signaling entity may control many SIP BE media entities and a number of these SIP BE media entities can be located hundreds of miles away. The SIP media entities transport the actual media traffic of the user devices. So, it is always economical to receive, process, and then route the media to the destination on the least-cost path as much as practicable with the least amount of delay. This can be seen by considering the signaling time required to set up a call and, once the call is set up, the communication time requirements for the media/speech traffic. During the call setup signaling time, user devices are not directly connected, and the round-trip signaling delay requirements are not stringent allowing the round-trip signaling delay to be of the order of a few seconds. However, when user devices are connected and they start communicating, the naturalness in communications dictates that the round trip delay for the media/speech traffic should not exceed a time threshold, for example 300 milliseconds. If the round trip delay for the media/speech traffic exceeds 300 milliseconds, the naturalness in communications is lost, appearing as if the users are talking in a stop and wait mode. The 300 millisecond delay threshold requires the media entities to be located as close as possible to the routing end destinations. For the signaling entity, the bandwidth for controlling the media entities is much lower than the media data rate the media entities are required to handle. Consequently, even if the signaling entity is located hundreds of miles away from a user device, the signaling propagation delay can be easily accommodated and therefore a single signaling entity can control multiple media entities. The different bandwidth characteristics of the SIP BE signaling entity 304 and the SIP BE media entities 306-310 demonstrate how the decomposition of the SIP BE provides flexibility to build a scalable network from both a performance and a resource utilization point of view.

Figure 4A:
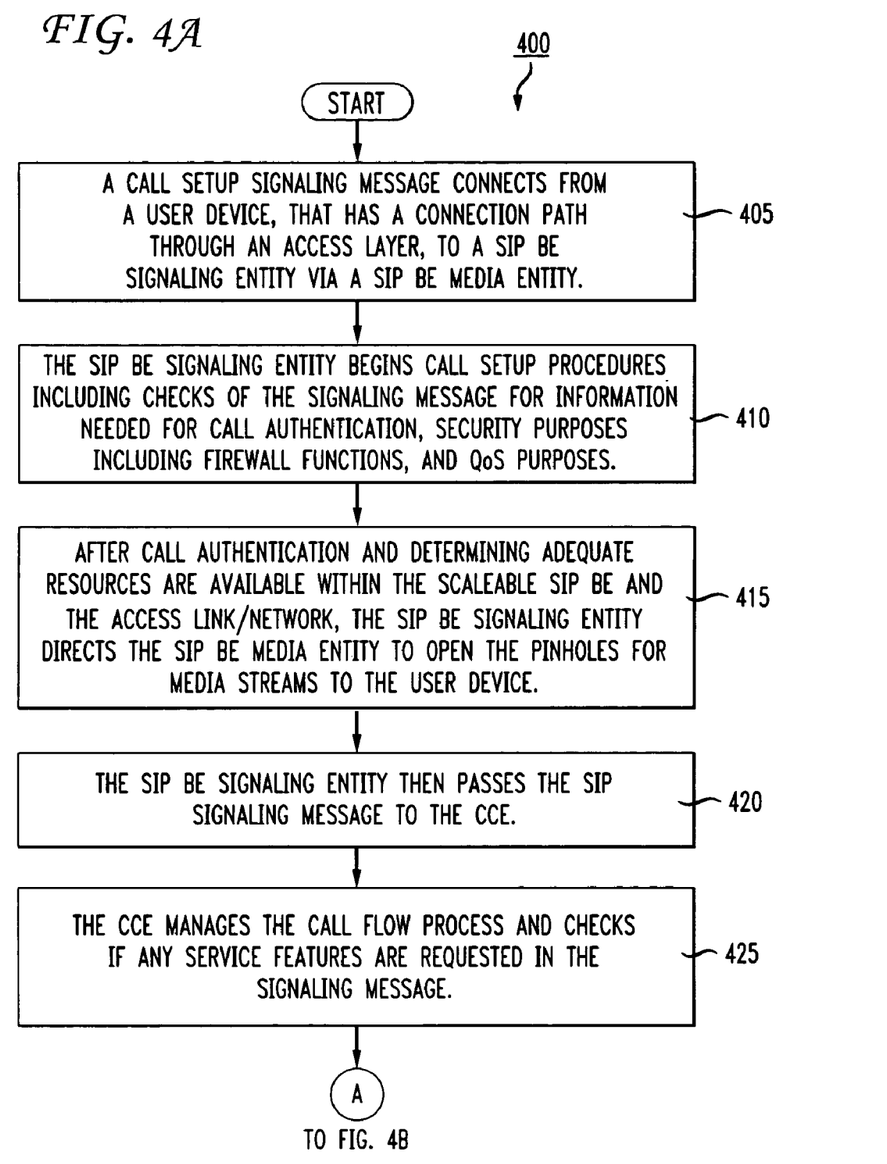
FIGS. 4A and 4B illustrate a basic call flow using the scalable decomposed SIP BE of FIG. 2 in accordance with the present invention.
Figure 4B:
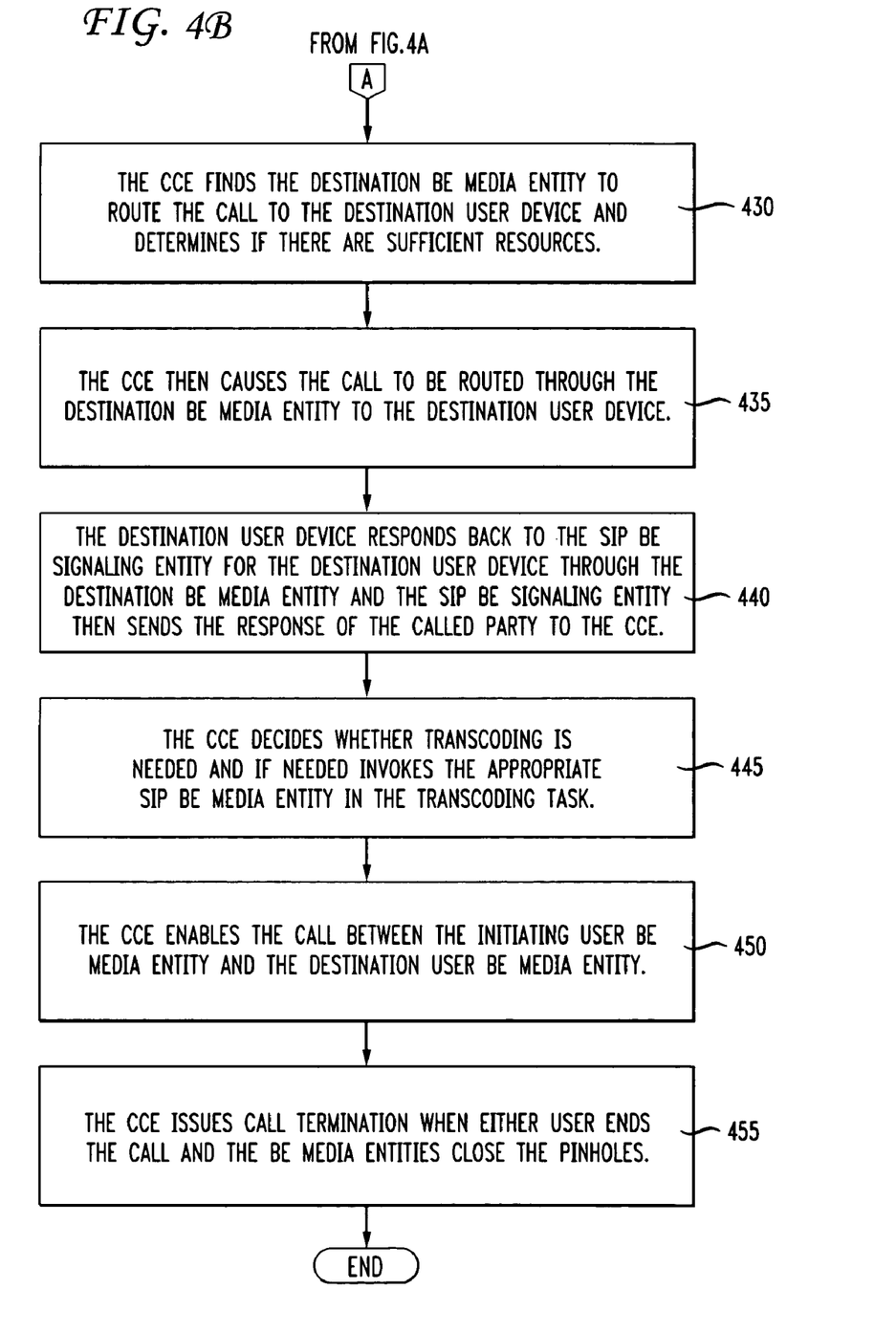

A basic call flow 400, as illustrated in FIGS. 4A and 4B, is presented next where the SIP BE used in this call flow is the decomposed SIP BE 205 FIG. 2, which has been split into two entities: SIP BE Signaling Entity 202 and SIP BE Media Entity-1 204. The Signaling entity 202 primarily has two distinct functions: SIP Proxy and SIP B2BUA. The SIP signaling entity 202 always appears as SIP proxy (more specifically as the outgoing SIP proxy) to the SIP user device. In addition, the SIP BE signaling entity 202 always acts as the SIP B2BUA when it communicates among the SIP-based entities of the AT&T VoIP Infrastructure. SIP BE Media Entity-1 204 has the following primary functions: RTP Media/DTMF Detection, Transcodings, Media firewall/NAT. The media firewall/NAT function of the media entity is common to both the signaling and media entity. For example, any traffic sent either to the signaling entity or to the media entity must be sent via the media firewall/NAT.

As seen in FIG. 4A, in step 405, a SIP call setup signaling message connects from a user IP device 206, over an access technology such as a local area network (LAN) 208 through the VoIP connectivity layer built upon the IP/MPLS core network 210, to the SIP signaling entity 202 via the SIP BE media entity-1 204 firewall/NAT entity. The firewall/NAT entity of the SIP BE media entity-1 204 acts as the boundary of the trust as specified by a pre-defined security policy for receiving and filtering the IP packets from the pre-defined IP address and port number. However, for SIP signaling traffic, the firewall/NAT sends the signaling traffic directly to the SIP BE signaling entity 202 for processing since the SIP BE media entity is not SIP protocol aware.

In step 410, the SIP signaling entity 202 checks the signaling message including headers and the Session Description Protocol (SDP) enclosure that provides information on what port numbers and IP addresses need to be opened by the firewall/NAT entity embedded in the SIP BE media entity-1 204. The port numbers and IP addresses are used by the RTP media stream 212 as specified by the SIP protocol-aware firewall/NAT control protocol, for example MIDCOM WG's protocol, extensions of MGCP or MEGACO protocol, or other such protocol, although MIDCOM WG's protocol is preferable.

Per security policy, the CCE 214 delegates the authentication of the user device to the SIP BE 202 as a part of the access control. The policy for the access control will be stored in the policy server located in the CAC 224. The access control security policy can be distributed using a security policy protocol, such as LDAP, or the SIP signaling entity 202 can load it from the CAC policy server 224 proactively. Of course, the SIP BE signaling entity 202 authenticates the user device 206 with the help of the AAA server located in the CAC 224 using the AAA protocol, for example the RADIUS/DIAMETER protocol, as delegated by the CCE 214 before opening the pinholes for IP addresses and port numbers of the RTP media stream 212. If authentication is successful, it then it is ok to open the pinholes. If authentication is not successful, it challenges the user device 206, and the user device 206 sends a reply based on the challenge with required credentials to make the security check authentic. However, CCE 214 can also overrule the authentication of the SIP BE 205, if needed for any reason. For example, if the user device 206 fails to authenticate as per security policy, the SIP BE signaling entity 202 rejects the call and lets the CCE 214 know the call was rejected.

Not every call is authenticated at the call setup time, since the authentication also depends on the security policy decided by the CCE 214. For example, a user device may also be authenticated at the time of registration or at the time of opening the channel for Transport Level Security (TLS)/Internet Protocol Security (IPSec) protocol. In addition, there may be a policy not to authenticate a call at the time of the call setup should the security association of the pre-call setup time be correlated with the time of the call setup by the AAA server in the CAC 224. When an TLS/IPSec channel is set up, the AAA server authenticates the user device and maintains the knowledge of user device authentication. Consequently, the AAA server performs the security associations required between the different layers removing the need for re-authentication steps and, as a result, the overall call setup time may be reduced.

If encryption is used between the SIP BE media entity-1 204 and the user device 206, the SIP BE signaling entity 202 encrypts and decrypts the signaling messages as necessary. In addition, SIP signaling entity 202 sends the encryption and decrypting key to the SIP BE media Entity-1 204 for the encryption/decryption process on the media traffic. Note that, all security keys are stored in the AAA server embedded in the CAC 224 and are distributed by the CAC AAA server as per security policy decided by the CCE 214.

In a similar manner to the security policy, the policy server embedded in the CAC 224 also distributes the QoS policy to the SIP BE signaling entity 202 using a protocol, such as COPS, or the SIP BE signaling entity 202 can load the QoS policy for the access control from the CAC policy server. Given the information in the SIP BE signaling entity 202 that was sent by the user device 206, the SIP BE signaling entity 202 also determines what the QoS/performance requirements for the access control are in accordance to the access QoS policy. For example, the SIP BE signaling entity 202 determines whether the total number of simultaneous calls in the access link/network is within the desired limit. The SIP BE media entity-1 204 then checks whether there are sufficient resources available in the access network to meet the desired QoS/performance requirements of the user device 206. If there are sufficient resources in the access network as the SIP BE signaling entity 202 knows of, it then permits the call of the user device. Otherwise, the SIP BE signaling entity 202 declines to accept the call and provides a notification for not-accepting the call to the CCE 214. The information about the access link/network resources abstracted in the VoIP connectivity layer, for example the total number of simultaneous calls that can be accepted, can be pre-provisioned based on a service level agreement (SLA). If the resources need to be reserved dynamically either in the access link/network or in the backbone network it can be done via CAC server interworking with a common VoIP QoS/Performance interface between the VoIP connectivity layer and the access layer and the SIP BE 205 need not be directly involved. However, the SIP BE 205 can provide the inputs for the VoIP resources availability determination, for example, determining whether or not media ports/IP addresses and media throughput capacity are within the capacity of the BE available, for acceptance of the call. If the media ports or throughput capacity within the RTP media entity are not available, for example, the SIP BE signaling entity 202 can reject the call and inform the CCE 214 accordingly.

In step 415, after successful authorization of the user device and checking that VoIP resources are available within the BE and possibly access link/network resources abstracted in the VoIP connectivity layer as described above, the SIP signaling entity 202 directs the firewall/NAT of the SIP BE Media Entity-1 204 to open the pinholes for media streams for user device 206. It may be clarified that the firewall/NAT deals with the IP packets, however, the RTP media entity of the SIP BE media entity-1 204 converts the IP packets into RTP media streams to detect if there are any DTMF digits and re-originates the RTP media streams. Then the RTP media entity reconverts the RTP packets into IP packets for sending over the firewall/NAT to the destination.

In step 420, the SIP BE signaling entity 202 then passes the signaling message over the SIP interface 216 to the call control element 214 after checking security and resource availability in the access network.

In step 425, the CCE 214 manages the call flow process, checks if any service features are requested in the signaling message and contacts the SB 226 to see whether there is any service feature. If there is a service feature, the SB 226 will inform the CCE 214 which application server, for example AS 218, needs to be contacted for serving the call. Then AS 218 instructs the CCE to set up the call-leg with the appropriate entity, for example, using the MS 230 for playing the announcement.

If AS 218 finds that the caller has the DTMF services feature, it then instructs the CCE 214 to inform SIP BE signaling entity 202 which DTMF digits/strings need to be detected. SIP BE signaling entity 202 instructs SIP media entity-1 204 to detect the appropriate DTMF digits/strings from RTP media streams 212 sent from the user device 206. The RTP media entity of SIP BE media entity-1 204 then checks for DTMF accordingly in the RTP streams 212 received from the user device 206 and does not send those RTP streams 212 which contain the DTMF digits or strings to the destination user device. Upon detection of the specified DTMF digits or strings, the SIP BE media entity-1 204 sends those DTMF digits or strings to the SIP BE signaling entity 202. The SIP BE signaling entity 202 then sends all DTMF digits/strings to AS 218 directly using a protocol 220 such as KPML/HTTP, SIP SUBSCRIBE/NOTIFY.

In the case of a simple call where there is no service feature, the SB 226 will report back to the CCE 214 that there is no service feature.

In step 430 FIG. 4B, the CCE 214 finds the destination BE media entity (not shown in FIG. 2) to route the call to the destination user device. The CCE 214 finds the destination BE media entity by contacting the NRE 228. The NRE 228 then computes a routing algorithm to find the destination media entity considering the VoIP resources between the source and the destination and informs CCE 214 accordingly. The CCE 214 then contacts CAC server 224 to find whether sufficient resources are available between the source and the destination user devices. The CAC server 224 and QoS function determines if sufficient resources are available between the source and the destination user devices and the CAC server 224 reports back to the CCE 214.

In step 435, the CCE 214 causes the pinholes to be opened at the destination and the call to be routed through the destination BE media entity to the destination user device (not shown).

In step 440, the destination user device responds back to the SIP BE signaling entity for the destination user device through the destination BE media entity and the SIP BE signaling entity then sends the response of the called party to the CCE 214.

In step 445, the CCE 214 decides whether or not transcoding is needed. If the codecs of both parties are the same, there is no need for transcoding. If there are dissimilar codecs, then transcoding is needed. The CCE 214 decides which BE needs to perform the transcoding and notifies the SIP BE signaling entity what codecs need to be used for transcoding. Then a SIP BE signaling entity, such as 202, instructs a SIP BE media entity-1, such as 204, what codec needs to be used for the transcoding task. The RTP media entity-1 204 then transcodes the media stream accordingly so that all reformatted RTP media are consistent with the receiving codecs used by the user devices at both ends of the call.

In step 450, the CCE enables the call between the initiating user device BE media entity and the destination user device BE media entity.

In step 455, when either user device ends the call, the SIP BE, such as SIP BE 205, receives the BYE information, to terminate the call, from the CCE 214. The SIP BE media entities close the pineholes of those IP addresses and port numbers so that no media traffic can flow through and the call is terminated.

Further SIP BE Decompositions for Scalability

Figure 5:
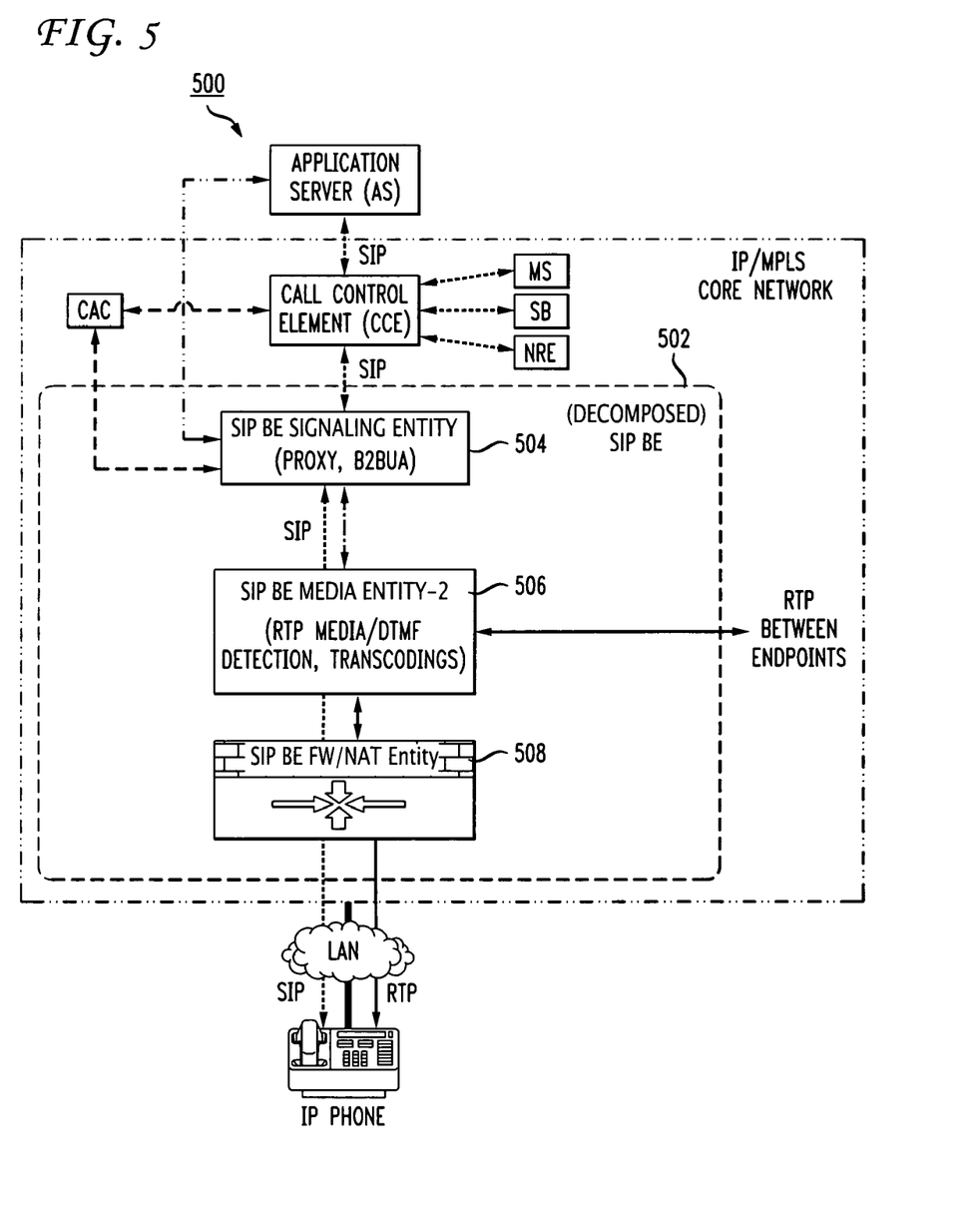
FIG. 5 illustrates a second level of decomposition of a SIP BE where the type-1 SIP BE media entity is separated into a type-2 SIP BE media entity and a SIP BE firewall/network address translation (FW/NAT) entity in accordance with the present invention.

The SIP BE media entity can further be decomposed through separation of the firewall/NAT and RTP media entity where the FW/NAT handles only the IP traffic while the RTP media entity handles the RTP media streams. FIG. 5 shows a simplified system 500 illustrating the further decomposition of the SIP BE 502: into a SIP BE signaling entity 504, a SIP BE media entity-2 506 supporting RTP media, DTMF detection, and media transcoding and a SIP BE FW/NAT entity 508. Now the signaling entity 504 can communicate with the media entity-2 506 directly using a protocol such as MGCP, MEGACO, IPDC, or other similar type of protocol. In a similar manner, the signaling entity 504 can also communicate with the FW/NAT entity 508 directly using a protocol such as MIDCOM. Depending upon configurations and system requirements, it is noted that a different low-level protocol may be used, between the SIP BE media entity-2 506 and the SIP BE FW/NAT entity 508 should they be located in different physical locations.

The decomposition shown in FIG. 5 provides the opportunity to further optimize the media functions. For example, the SIP BE media entity-2 506 can be optimized primarily to perform RTP related media relay including transcodings. The SIP BE FW/NAT entity 508 can be optimized primarily to deal with IP packet streams without being aware of the RTP packets. This is because the RTP packet part carries additional information including DTMF, time synchronization information, and the like as compared to the IP packet. As a result, each functional entity can be optimized for their specific functionalities providing economies-of-scale to handle large volumes of traffic which at times may exceed gigabit and terabit data rates.

The decomposition of the SIP BE media entity-1 into a SIP BE media entity-2 and a SIP BE FW/NAT entity does not affect the scalability aspects of the SIP BE signaling entity. A single SIP BE signaling entity can still control multiple SIP BE media entities-2 with their associated SIP BE FW/NAT entities. For simplicity, those configurations have not been shown. This distribution of the media functions further helps to optimize the design of the SIP BE for designing a large-scale network.

Figure 6:
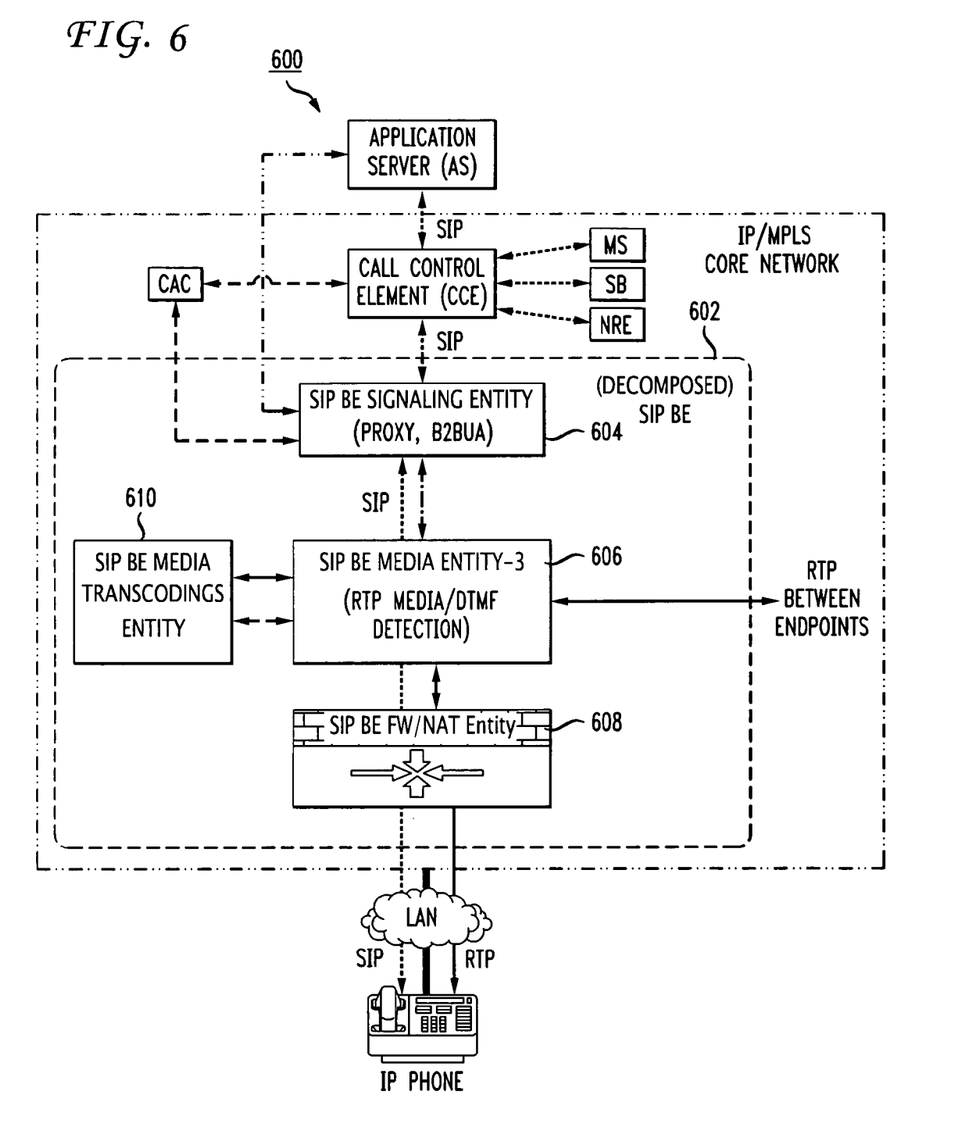
FIG. 6 illustrates a third level of decomposition of a SIP BE where the type-2 SIP BE media entity is separated into a type-3 SIP BE media entity and a SIP BE media transcoding entity in accordance with the present invention.

Another function affecting both the scalability and the cost efficiency of an implementation is the transcoding function. Media transcoding requires a lot of signal processing power, and, in many system configurations, it may be worthwhile to share the media transcoding capabilities among multiple entities. FIG. 6 shows a system configuration 600 where a SIP BE 602 is decomposed into four elements. The four elements that make up the SIP BE 602 are a SIP BE signaling entity 604, SIP BE media entity-3 606, SIP BE FW/NAT entity 608 and a SIP BE media transcoding entity 610. This decomposition is done so that a single transcoding entity can be shared among multiple SIP media entities to optimize the media resources further, if needed. More specifically, the SIP BE media entity-3 606 controls the transcoding entity 610 while the SIP BE media entity-3 606 is controlled by the SIP BE signaling entity 604. A control protocol between the media transcoding entity 610 and the media entity 606 communicates how the transcoding is to be done.

It is important to note that a single SIP BE signaling entity can control many media entities that directly control the transcoding entities and FW/NAT entities. Also, a single media entity can control more than one transcoding entity and multiple media entities can share a single transcoding entity. For example, system configuration 700 of FIG. 7 illustrates a decomposition of the SIP BE 702 where a single SIP BE signaling entity 704 and a single transcoding entity 705 are shared by multiple media entities-3, 706, 708, and 710, and multiple FW/NAT entities, 712, 714, and 716.

Figure 7:
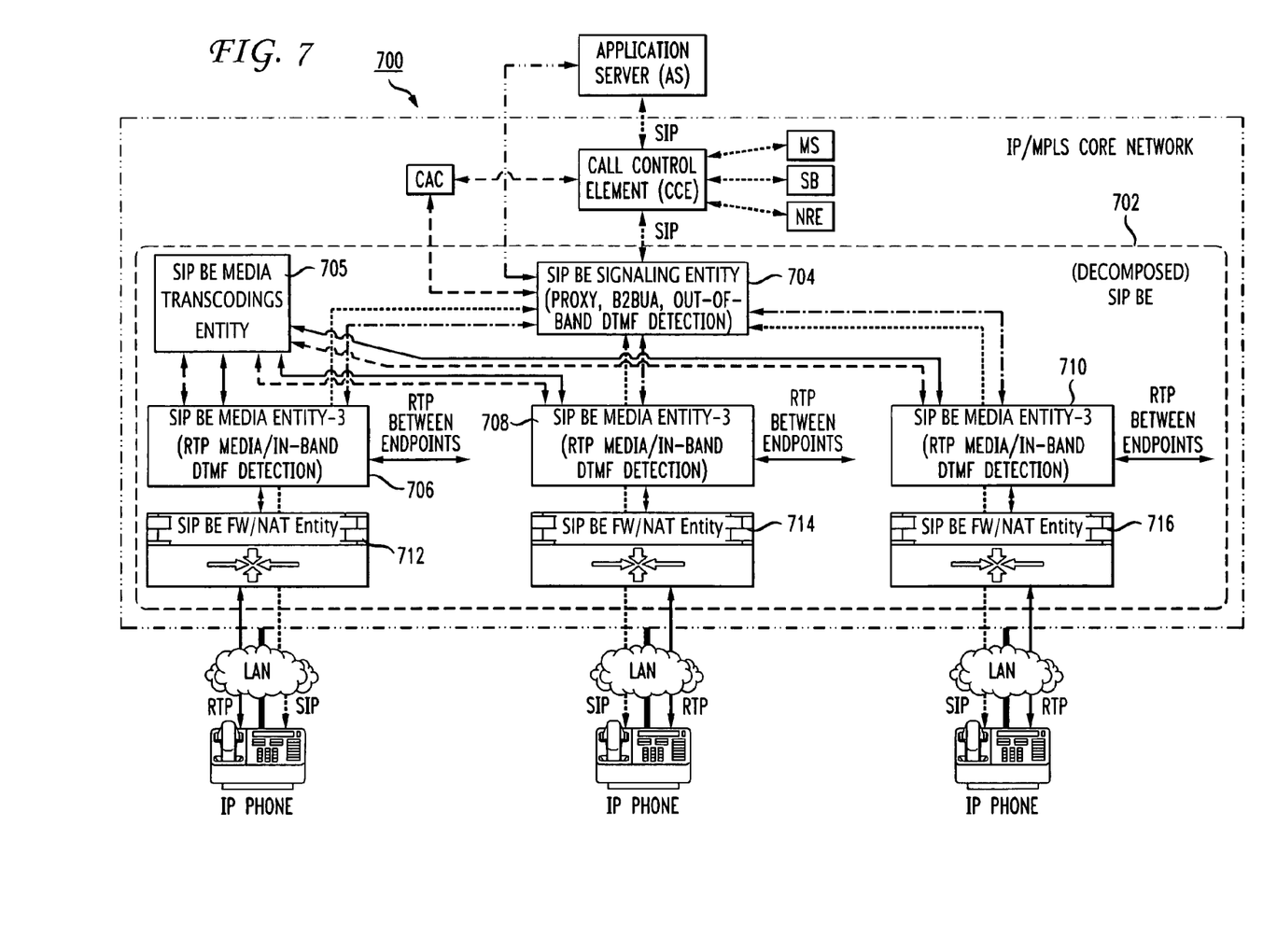
FIG. 7 illustrates the scalable aspects of the third level of decomposition of the SIP BE of FIG. 6 where a single SIP BE signaling entity controls multiple type-3 SIP BE media entities and a single SIP BE media transcodings entity serves multiple type-3 SIP BE media entities.

Finally, a system 100 can be adapted in accordance with the present invention by replacing one or more of the SIP BEs 114-117 by scalable SIP BEs, where the BEs are like BE 205 of FIG. 2, BE 302 of FIG. 3, BE 502 of FIG. 5, BE 602 of FIG. 6, BE 702 of FIG. 7 or combinations or variations thereof.

One or more or indeed all of the SIP BE decomposed functions could be realized by one or more appropriately programmed processors. The processing steps of FIGS. 4A and 4B, including the detailed operational description provided herein, represent the functional information required to create appropriate programs to provide these functions. The program or programs can be stored in an electronic form on a computer useable medium which can include diskettes, CD-ROM, DVD-ROM, storage on a hard drive, storage in a memory device using random access memory, flash memory, read only memory or the like, in downloadable form for downloading through an electronic transport medium, and the like.

While the present invention has been disclosed in a presently preferred context, it will be recognized that the present teachings may be adapted to a variety of contexts consistent with this disclosure and the claims that follow.

We claim:

1. A scalable system for providing real time communication services between user devices, the scalable system comprising:

a call control element providing system call control functions;

a scalable border element providing scalable system interface functions and in communication with the call control element;

a first user device for initiating a call and in communication with the scalable border element; and a second user device acting as a call destination device and in communication with the scalable border element, wherein the scalable border element comprises:

a border element signaling entity providing border element signaling functions and in communication with the call control element;

a first border element media entity providing border element media functions in communication with the border element signaling entity and in communication with the first user device for initiating the call; and a second border element media entity providing border element media functions in communication with the border element signaling entity, in communication with the first border element media entity for media transfers and in communication with the second user device acting as the call destination device.

2. The scalable system of claim 1 wherein the scalable system interface functions comprise:

signaling functions including call setup signaling functions;
media control functions including transcoding functions;
security functions including firewall and encryption and decryption functions; and
call admission control functions including call authentication functions.

3. The scalable system of claim 1 wherein the border element signaling functions comprise:
user agent functions;
proxy functions; and
back to back user agent functions.

4. The scalable system of claim 1 wherein the border element media functions comprise:
dual tone multi-frequency digit detection;
real time protocol re-origination;
firewall and network address translation functions; and
media transcoding functions.

5. The scalable system of claim 4 further comprising:
an application server providing a scalable system service function and in communication with the call control element.

6. The scalable system of claim 1 wherein the communication between the scalable border element and the call control element uses a session initiation protocol.

7. The scalable system of claim 1 wherein the communication between the border element signaling entity and the first border element media entity is a master/slave protocol where the border element signaling entity acts as a master and the first border element media entity acts as a slave.

8. The scalable system of claim 1, wherein:
the first border element media entity and the second border element media entity are located physically apart from each other and in closer proximity to the first and second user devices than to the border element signaling entity; and
wherein a call placed between the first and second user devices comprises signaling messages and media transfers, wherein a timing threshold for the signaling messages is less than a few seconds and the timing threshold for the media transfers is less than approximately 300 milliseconds.

9. The scalable system of claim 5 wherein upon a detection of a dual tone multiple frequency digit by one of the first and second border element media entities the one of the first and second border element media entities notifies the border element signaling entity of the dual tone multiple frequency digit detection, and the border element signaling entity notifies the application server of the dual tone multiple frequency digit detection over a separate signaling path.

10. The scalable system of claim 1 further comprising:
a call admission control entity in communication with the scalable border element and in communication with the call control element;
a media server entity in communication with the call control element;
a service broker entity in communication with the call control element; and
a network routing engine in communication with the call control element.

11. The scalable system of claim 1 wherein the scalable border element further comprises:
a first border element firewall/network address translation entity providing border element firewall and network address translation functions in communication with the first border element media entity and in communication with the first user device; and
a second border element firewall/network address translation entity providing border element firewall and network address translation functions in communication with the second border element media entity and in communication with the second user device.

12. The scalable system of claim 11 wherein the border element media functions comprise:
dual tone multi-frequency digit detection;
real time protocol re-origination; and
media transcoding functions.

13. The scalable system of claim 11 wherein the scalable border element further comprises:
a media transcoding entity providing border element media transcoding functions.

14. The scalable system of claim 13 wherein the border element media functions comprise:
dual tone multi-frequency digit detection; and
real time protocol re-origination.

15. A method of connecting a call between user devices comprising:
connecting a first user device to a scalable border element, wherein the scalable border element comprises:
a border element signaling entity providing border element signaling functions and in communication with a call control element;
a first border element media entity providing border element media functions in communication with the border element signaling entity and in communication with the first user device; and
a second border element media entity providing border element media functions in communication with the border element signaling entity, in communication with the first border element media entity for media transfers and in communication with a second user device acting as a call destination device;
receiving in the BE border element signaling entity a signaling message from the first user device to setup the call;
communicating the signaling message from the border element signaling entity to the call control element that manages a call flow process and determines a path to the second user device and a second border element media entity associated with the second user device;
opening pinholes for media streams;
connecting the first border element media entity to the second border element media entity for media transfers;
communicating between the call control element and the second border element media entity to determine if transcoding is required and to determine if the call control element is invoking an appropriate border element media entity to provide the transcoding; and
establishing a call connection between the first user device and the second user device.

16. The method of claim 15 further comprising:
communicating between the call control element and the border element signaling entity when one of: the first user device and the second user device indicates it is ending the call; and
communicating a call termination from the call control element to the first and the second border element media entities to close the pinholes thereby terminating the call.

17. The method of claim 15 wherein the call control element:
communicates with a service broker to determine whether a service feature is required;

communicates with an application server to service the call; and communicates with a media server to provide media stream functions when required.

18. A non-transitory computer-readable medium encoded with computer executable instructions that when executed cause a computer system to perform call connection services between user devices using a decomposed border element, made up of a border element signaling entity and a plurality of border element media entities, between the user devices and the computer system, by performing:

connecting a first user device to a first border element media entity and to the border element signaling entity;

receiving in the border element signaling entity a signaling message from the first user device to setup a call;

communicating the signaling message from the border element signaling entity to a call control element that manages a call flow process and determines a path to a destination user device and a second border element media entity associated with the destination user device;

opening pinholes for media streams;

connecting the first border element media entity to the second border element media entity for media transfers;

communicating between the call control element and the second border element media entity to determine if transcoding is required and if it is invoking the appropriate border element media entity to provide the transcoding; and establishing a call connection between the first user device and the destination user device.

19. The non-transitory computer-readable medium of claim 18 wherein the call connection is terminated, by further performing:

communicating between the call control element and the first and second border element signaling entities when one of: the first user device and the destination device indicates it is ending the call; and communicating a call termination from the call control element to the first and the second border element media entities to close the pinholes.

20. The non-transitory computer-readable medium of claim 18 wherein the call control element further performs:

communicating with a service broker to determine whether a service feature is required;

communicating with an application server to service the call; and communicating with a media server to provide media stream functions when required.

* * * * *